(12) United States Patent
Moreso et al.

(10) Patent No.: US 12,378,335 B2
(45) Date of Patent: Aug. 5, 2025

(54) RUBBER COMPOSITION

(71) Applicant: COMPAGNIE GENERALE DES ETABLISSEMENTS MICHELIN, Clermont-Ferrand (FR)

(72) Inventors: Emma Moreso, Clermont-Ferrand (FR); José-Carlos Araujo Da Silva, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 259 days.

(21) Appl. No.: 17/641,171

(22) PCT Filed: Sep. 17, 2020

(86) PCT No.: PCT/FR2020/051604
§ 371 (c)(1),
(2) Date: Aug. 17, 2022

(87) PCT Pub. No.: WO2021/053296
PCT Pub. Date: Mar. 25, 2021

(65) Prior Publication Data
US 2024/0287222 A1    Aug. 29, 2024

(30) Foreign Application Priority Data
Sep. 18, 2019  (FR) ..................... 1910301

(51) Int. Cl.
| | | |
|---|---|---|
| C08F 210/02 | (2006.01) | |
| B60C 1/00 | (2006.01) | |
| C08F 236/22 | (2006.01) | |
| C08K 3/04 | (2006.01) | |
| C08K 3/36 | (2006.01) | |
| C08L 23/0807 | (2025.01) | |

(52) U.S. Cl.
CPC .......... *C08F 210/02* (2013.01); *B60C 1/0016* (2013.01); *C08K 3/04* (2013.01); *C08K 3/36* (2013.01); *C08L 23/083* (2013.01); *C08F 2800/10* (2013.01); *C08F 2810/20* (2013.01); *C08K 2201/014* (2013.01); *C08L 2205/08* (2013.01)

(58) Field of Classification Search
CPC ........ C08F 210/02; C08F 236/22; C08K 3/36; C08K 3/04
USPC ........................................................ 524/526
See application file for complete search history.

(56) References Cited

U.S. PATENT DOCUMENTS

| | | | | |
|---|---|---|---|---|
| 5,837,791 | A | * 11/1998 | Sagane | ................... C07C 11/21 526/348.3 |
| 2015/0038657 | A1 | * 2/2015 | Washizu | ............... C08F 236/22 526/173 |
| 2020/0040170 | A1 | 2/2020 | Araujo Da Silva et al. | |

FOREIGN PATENT DOCUMENTS

| | | |
|---|---|---|
| WO | 2013128977 A1 | 7/2015 |
| WO | 2018189456 A1 | 10/2018 |
| WO | 2019180355 A1 | 9/2019 |
| WO | 2019180356 A1 | 9/2019 |

OTHER PUBLICATIONS

International Search Report and Written Opinion, with English translation, mailed Jan. 12, 2021 for International Application No. PCT/FR2020/051604, 10 pages.
Xiaorui Ren et al., Scandium-catalyzed copolymerization of myrcene with ethylene and propylene: convenient syntheses o , Polymer Chemistry, 2018, vol. 9, No. 10, p. 1223-1233.
Royal Society of Chemistry, the bibliographical items of "Polymer Chemistry Issue 10,2018", [searched on Mar. 16, 2023].

* cited by examiner

*Primary Examiner* — Deve V Hall
(74) *Attorney, Agent, or Firm* — Dickinson Wright PLLC

(57) ABSTRACT

A rubber composition which comprises a reinforcing filler, a crosslinking system and more than 50 to 100 phr of an elastomer which is a copolymer of ethylene and of a 1,3-diene $CH_2=CR-CH=CH_2$, the symbol R representing a hydrocarbon chain having from 3 to 20 carbon atoms. The rubber composition has a good compromise between the stiffness and hysteresis properties.

18 Claims, No Drawings

RUBBER COMPOSITION

CROSS-REFERENCE TO RELATED APPLICATIONS

This U.S. national phase patent application claims priority to and the benefit of International Patent Application No. PCT/FR2020/051604, filed on Sep. 17, 2020, which claims priority to and the benefit of French patent application no. FR1910301, filed Sep. 18, 2019, the contents of which are incorporated herein by reference in their entirety.

BACKGROUND

1. Technical Field

The present invention relates to diene rubber compositions intended to be used in a tyre which predominantly contain, as elastomer, a copolymer of ethylene and of 1,3-diene.

2. Related Art

The diene rubber compositions customarily used in tyres are rubber compositions reinforced with highly unsaturated diene elastomers such as polybutadienes, polyisoprenes, and copolymers of butadiene and styrene.

It has been proposed, in particular in document WO 2014114607, to use copolymers of ethylene and of 1,3-butadiene in rubber compositions for tyres. These copolymers are synthesized by copolymerization of ethylene and 1,3-butadiene in the presence of a catalytic system comprising a rare-earth metallocene. The reinforced rubber compositions of ethylene/1,3-butadiene copolymer are in particular described for improving the compromise between the performance properties of a tyre which are the wear resistance and the rolling resistance. These diene rubber compositions, once crosslinked, exhibit a much higher stiffness than the diene rubber compositions customarily used and may therefore prove unsuitable for certain applications. There is therefore a need to significantly reduce the cured stiffness of such compositions comprising an ethylene-based diene rubber.

It is known to decrease the cured stiffness of a diene rubber composition by decreasing the bridging density of the rubber composition. This is unfortunately also accompanied by an increase in the hysteresis of the rubber composition.

SUMMARY

The applicant has discovered a reinforced rubber composition based on a copolymer of ethylene and of 1,3-diene which does not have the drawbacks mentioned since it has an improved compromise between the properties of stiffness and hysteresis.

Thus, a first object of the invention is a rubber composition which comprises a reinforcing filler, a crosslinking system and more than 50 phr to 100 phr of an elastomer which is a copolymer of ethylene and of a 1,3-diene of formula (I), $$CH_2=CR-CH=CH_2 \quad (I)$$

the symbol R representing a hydrocarbon chain having from 3 to 20 carbon atoms.

Another subject of the invention is a tyre comprising a tread, which tyre comprises a rubber composition in accordance with the invention, preferably in the tread.

DETAILED DESCRIPTION

Any interval of values denoted by the expression "between a and b" represents the range of values greater than "a" and less than "b" (that is to say limits a and b excluded), whereas any interval of values denoted by the expression "from a to b" means the range of values extending from "a" up to "b" (that is to say including the strict limits a and b). The abbreviation "phr" means parts by weight per hundred parts by weight of elastomer (of the total of the elastomers if several elastomers are present).

The expression "based on" used to define the constituents of a catalytic system or of a composition is understood to mean the mixture of these constituents, or the product of the reaction of a portion or of all of these constituents with one another.

Unless otherwise indicated, the contents of the units resulting from the insertion of a monomer into a copolymer are expressed as molar percentage with respect to all of the monomer units of the copolymer.

The compounds mentioned in the description can be of fossil origin or be biobased. In the latter case, they may be partially or completely derived from biomass or be obtained from renewable starting materials derived from biomass. Elastomers, plasticizers, fillers and the like are notably concerned.

Since the 1,3-diene of formula (I) as defined above and which is useful for the purposes of the invention is a substituted 1,3-diene, the 1,3-diene can give rise to units of 1,2 configuration represented by the formula (1), of 3,4 configuration represented by the formula (2) and of 1,4 configuration, the trans form of which is represented below by the formula (3).

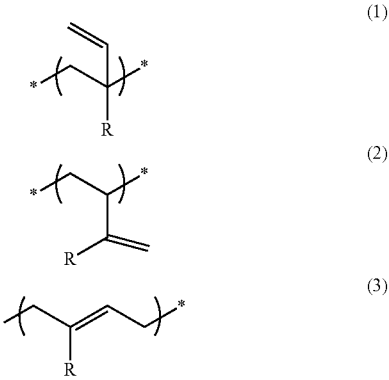

As is also well known, the ethylene unit is a unit of —($CH_2$—$CH_2$)— moiety.

The copolymer which is useful for the purposes of the invention is a copolymer of ethylene and of the 1,3-diene, which implies that the monomer units of the copolymer are units resulting from the polymerization of ethylene and of the 1,3-diene. The copolymer thus comprises ethylene units and units of the 1,3-diene. According to any one of the embodiments of the invention, the 1,3-diene is just one compound, that is to say just one 1,3-diene of formula (I), or is a mixture of 1,3-dienes of formula (I), the 1,3-dienes of the mixture differing from one another by the group represented by the symbol R. The copolymer which is useful for the purposes of the invention is advantageously a statistical copolymer according to any one of the embodiments of the invention.

Preferably, the copolymer contains ethylene units which represent between 50 mol % and 95 mol % of the monomer units of the copolymer, that is to say between 50 mol % and 95 mol % of the ethylene units and of the units of the 1,3-diene. Very preferentially, the copolymer contains ethylene units which represent at least 60 mol % of the ethylene units and of the units of the 1,3-diene. More preferentially, the copolymer contains ethylene units which represent at least 70 mol % of the ethylene units and of the units of the 1,3-diene. Preferably, the copolymer contains ethylene units which represent at most 90 mol % of the ethylene units and of the units of the 1,3-diene.

According to one particular embodiment of the invention, the copolymer contains ethylene units which represent at most 85 mol % of the ethylene units and of the units of the 1,3-diene.

According to one preferential embodiment of the invention, in the copolymer in accordance with the invention, the ethylene units represent from 60 mol % to 90 mol % of the ethylene units and of the units of the 1,3-diene, advantageously from 70 mol % to 90 mol % of the ethylene units and of the units of the 1,3-diene.

According to another particular embodiment of the invention, in the copolymer in accordance with the invention, the ethylene units represent from 60 mol % to 85 mol % of the ethylene units and of the units of the 1,3-diene, advantageously from 70 mol % to 85 mol % of the ethylene units and of the units of the 1,3-diene.

In formula (I) of the 1,3-diene, the hydrocarbon chain represented by the symbol R is an unsaturated chain of from 3 to 20 carbon atoms. Preferably, the symbol R represents a hydrocarbon chain having from 6 to 16 carbon atoms.

The hydrocarbon chain represented by the symbol R may be a saturated or unsaturated chain. Preferably, the symbol R represents an aliphatic chain, in which case in formula (I) of the 1,3-diene, the hydrocarbon chain represented by the symbol R is an aliphatic hydrocarbon chain. It may be a linear or branched chain, in which case the symbol R represents a linear or branched chain. Preferably, the hydrocarbon chain is acyclic, in which case the symbol R represents an acyclic chain. Better still, the symbol R represents an unsaturated and branched acyclic hydrocarbon chain. The hydrocarbon chain represented by the symbol R is advantageously an unsaturated and branched acyclic chain containing from 3 to 20 carbon atoms, in particular from 6 to 16 carbon atoms. Very advantageously, the 1,3-diene is myrcene or β-farnesene.

According to one preferential embodiment of the invention, the 1,3-diene is myrcene.

According to another preferential embodiment of the invention, the 1,3-diene is β-farnesene.

Preferably, the copolymer of ethylene and of the 1,3-diene has a glass transition temperature below −35° C., preferably between −90° C. and −35° C.

According to a first variant of the invention, the copolymer contains units of the 1,3-diene of 1,2 or 3,4 configuration which represent more than 50 mol % of the units of the 1,3-diene. In other words, in the copolymer the units of the 1,3-diene contain more than 50 mol % of the units of 1,2 configuration or of 3,4 configuration. In this variant, the balance to 100 mol % of the units of the 1,3-diene in the copolymer is completely or partially formed of units of the 1,3-diene of 1,4 configuration. According to this first variant, preferentially more than half of the units of the 1,3-diene of 1,4 configuration are of trans-1,4 configuration, more preferentially all the units of the 1,3-diene of 1,4 configuration are of trans-1,4 configuration.

According to a second variant of the invention, in the copolymer the units of the 1,3-diene contain more than 50% of 1,4 configuration. In other words, the units of the 1,3-diene of 1,4 configuration represent more than 50 mol % of the units of the 1,3-diene. In this variant, the balance to 100 mol % of the units of the 1,3-diene in the copolymer is completely or partially formed of units of the 1,3-diene of 1,2 or 3,4 configuration. Preferably, the units of the 1,3-diene of 1,4 configuration represent more than 70 mol % of the units of the 1,3-diene. Advantageously, more than half of the units of the 1,3-diene of 1,4 configuration are of trans-1,4 configuration, which means that the units of the 1,3-diene of trans-1,4 configuration represent more than 50 mol % of the units of the 1,3-diene of 1,4 configuration.

The copolymer may be prepared by a process which comprises the copolymerization of ethylene and of the 1,3-diene in the presence of a catalytic system based at least on a metallocene of formula (II) and on an organomagnesium compound of formula (III)

$Cp^1$ and $Cp^2$, which may be identical or different, being selected from the group consisting of the cyclopentadienyl group of formula $C_5H_4$, the unsubstituted fluorenyl group of formula $C_{13}H_8$ and substituted fluorenyl groups, P being a group bridging the two $Cp^1$ and $Cp^2$ groups and representing a $ZR^3R^4$ group, Z representing a silicon or carbon atom, $R^3$ and $R^4$, which are identical or different, each representing an alkyl group comprising from 1 to 20 carbon atoms, preferably a methyl, y, which is an integer, being equal to or greater than 0, x, which may or may not be an integer, being equal to or greater than 0, L representing an alkali metal selected from the group consisting of lithium, sodium and potassium, N representing a molecule of an ether, preferably diethyl ether or tetrahydrofuran, $R^1$ and $R^2$, which may be identical or different, representing a carbon group.

$$P(Cp^1Cp^2)Nd(BH_4)_{(1+y)}L_y\text{-}N_x \qquad (II)$$

$$MgR^1R^2 \qquad (III)$$

Mention may be made, as substituted fluorenyl groups, of those substituted by alkyl radicals having from 1 to 6 carbon atoms or by aryl radicals having from 6 to 12 carbon atoms. The choice of the radicals is also guided by the accessibility to the corresponding molecules, which are the substituted fluorenes, because the latter are commercially available or can be easily synthesized.

Mention may more particularly be made, as substituted fluorenyl groups, of the 2,7-di (tert-butyl) fluorenyl and 3,6-di (tert-butyl) fluorenyl groups. The 2, 3, 6 and 7 positions respectively denote the positions of the carbon atoms of the rings as represented in the diagram below, the 9 position corresponding to the carbon atom to which the bridge P is attached.

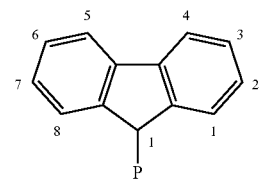

The catalytic system can be prepared conventionally by a process analogous to that described in patent application WO 2007054224 or WO 2007054223. For example, the organomagnesium compound and the metallocene are reacted in a hydrocarbon solvent typically at a temperature ranging from 20° C. to 80° C. for a period of time of between 5 and 60 minutes. The catalytic system is generally prepared in an aliphatic hydrocarbon solvent, such as methylcyclohexane, or an aromatic hydrocarbon solvent, such as toluene. Generally, after its synthesis, the catalytic system is used in this form in the process for the synthesis of the copolymer in accordance with the invention.

Alternatively, the catalytic system can be prepared by a process analogous to that described in patent application WO 2017093654 A1 or in patent application WO 2018020122 A1. According to this alternative, the catalytic system further contains a preformation monomer chosen from a conjugated diene, ethylene or a mixture of ethylene and a conjugated diene, in which case the catalytic system is based at least on the metallocene, the organomagnesium compound and the preformation monomer. For example, the organomagnesium compound and the metallocene are reacted in a hydrocarbon solvent, typically at a temperature of from 20° C. to 80° C. for 10 to 20 minutes to obtain a first reaction product, then the preformation monomer, chosen from a conjugated diene, ethylene or a mixture of ethylene and a conjugated diene, is reacted with this first reaction product at a temperature ranging from 40° C. to 90° C. for 1 h to 12 h. The conjugated diene, as preformation monomer, is preferably a 1,3-diene such as 1,3-butadiene, isoprene or else a 1,3-diene of formula (I), in particular myrcene or β-farnesene. The catalytic system thus obtained can be used immediately in the process in accordance with the invention or be stored under an inert atmosphere before the use thereof in the process in accordance with the invention.

The metallocene used for preparing the catalytic system can be in the form of a crystalline or non-crystalline powder, or else in the form of single crystals. The metallocene can be provided in a monomer or dimer form, these forms depending on the method of preparation of the metallocene, as for example is described in patent application WO 2007054224 or WO 2007054223. The metallocene can be prepared conventionally by a process analogous to that described in patent application WO 2007054224 or WO 2007054223, in particular by reaction, under inert and anhydrous conditions, of the salt of an alkali metal of the ligand with a rare earth borohydride in a suitable solvent, such as an ether, like diethyl ether or tetrahydrofuran, or any other solvent known to a person skilled in the art. After reaction, the metallocene is separated from the reaction by-products by techniques known to a person skilled in the art, such as filtration or precipitation from a second solvent. In the end, the metallocene is dried and isolated in the solid form.

Like any synthesis carried out in the presence of an organometallic compound, the synthesis of the metallocene and that of the catalytic system take place under anhydrous conditions under an inert atmosphere. Typically, the reactions are carried out starting from anhydrous solvents and compounds under anhydrous nitrogen or argon.

The organomagnesium compound of use for the requirements of the invention is of formula $MgR^1R^2$ in which $R^1$ and $R^2$, which may be identical or different, represent a carbon group.

Carbon group is understood to mean a group which contains one or more carbon atoms. Preferably, $R^1$ and $R^2$ contain from 2 to 10 carbon atoms. More preferentially, $R^1$ and $R^2$ each represent an alkyl. The organomagnesium compound is advantageously a dialkylmagnesium compound, better still butylethylmagnesium or butyloctylmagnesium, even better still butyloctylmagnesium.

According to any one of the embodiments of the invention, the molar ratio of the organomagnesium compound to the metal Nd constituting the metallocene is preferably within a range extending from 1 to 100, more preferentially is greater than or equal to 1 and less than 10. The range of values extending from 1 to less than 10 is in particular more favourable for obtaining copolymers of high molar masses.

When the copolymer useful for the purposes of the invention is a copolymer which has a microstructure as defined according to the first variant of the invention, it is prepared according to the process mentioned in the present application using a metallocene of formula (II) in which $Cp^1$ and $Cp^2$, which may be identical or different, are selected from the group consisting of substituted fluorenyl groups and the unsubstituted fluorenyl group of formula $C_{13}H_8$. For this variant, the metallocenes of the following formulae, in which the symbol Flu presents the fluorenyl group of formula $C_{13}H_8$, are particularly suitable: [{Me$_2$SiFlu$_2$Nd(μ-BH$_4$)$_2$Li(THF)}$_2$]; [Me$_2$SiFlu$_2$Nd(μ-BH$_4$)$_2$Li(THF)]; [Me$_2$SiFlu$_2$Nd(μ-BH$_4$)(THF)]; [{Me$_2$SiFlu$_2$Nd(μ-BH$_4$)(THF)}$_2$]; [Me$_2$SiFlu$_2$Nd(μ-BH$_4$)].

When the copolymer useful for the purposes of the invention is a copolymer which has a microstructure as defined according to the second variant of the invention, it is prepared according to the process mentioned in the present application using a metallocene of formula (II) in which $Cp^1$ denotes a cyclopentadienyl group Cp of formula $C_5H_4$ and $Cp^2$ denotes a fluorenyl group Flu of formula $C_{13}H_8$.

Those skilled in the art also adapt the polymerization conditions and the concentrations of each of the reactants (constituents of the catalytic system, monomers) according to the equipment (devices, reactors) used to carry out the polymerization and the various chemical reactions. As is known to those skilled in the art, the copolymerization and the handling of the monomers, of the catalytic system and of the polymerization solvent(s) take place under anhydrous conditions and under an inert atmosphere. The polymerization solvents are typically aliphatic or aromatic hydrocarbon solvents.

The polymerization is preferably carried out in solution, continuously or batchwise. The polymerization solvent can be an aromatic or aliphatic hydrocarbon solvent. Mention may be made, as examples of polymerization solvent, of toluene and methylcyclohexane. The monomers can be introduced into the reactor containing the polymerization solvent and the catalytic system or, conversely, the catalytic system can be introduced into the reactor containing the polymerization solvent and the monomers. The copolymerization is typically carried out under anhydrous conditions and in the absence of oxygen, in the optional presence of an inert gas. The polymerization temperature generally varies within a range extending from 30 to 150° C., preferentially from 30 to 120° C. Preferably, the copolymerization is carried out at constant ethylene pressure.

During the polymerization of the ethylene and the 1,3-diene in a polymerization reactor, ethylene and the 1,3-diene can be added continuously to the polymerization reactor, in which case the polymerization reactor is a fed reactor. This embodiment is very particularly suitable for the synthesis of a statistical copolymer.

The polymerization can be halted by cooling the polymerization medium. The polymer can be recovered according to conventional techniques known to those skilled in the art, such as, for example, by precipitation, by evaporation of the solvent under reduced pressure or by steam stripping.

The rubber composition according to the invention comprises more than 50 to 100 phr of a copolymer of ethylene and of a 1,3-diene of formula (I) as defined in one of any of the embodiments described above, including variants thereof. It is understood that the copolymer may consist of a mixture of copolymers which differ from one another in their microstructure or their macrostructure. When the content of the copolymer of ethylene and of a 1,3-diene of formula (I) is greater than 50 phr and less than 100 phr, the balance to 100 phr can be provided by another elastomer, in particular another diene elastomer known to those skilled in the art. This other diene elastomer can be an elastomer conventionally used in rubber compositions for tyres such as polybutadienes, polyisoprenes, 1,3-butadiene copolymers and isoprene copolymers. According to a preferential embodiment, the rubber composition comprises 100 phr of a copolymer of ethylene and of a 1,3-diene of formula (I).

Another essential feature of the rubber composition in accordance with the invention is that it comprises a reinforcing filler. The rubber composition can comprise any type of "reinforcing" filler known for its abilities to reinforce a rubber composition which can be used for the manufacture of tyres, for example an organic filler, such as carbon black, a reinforcing inorganic filler, such as silica, with which is combined, in a known way, a coupling agent, or else a mixture of these two types of filler. Such a reinforcing filler typically consists of nanoparticles, the (weight-) average size of which is less than a micrometre, generally less than 500 nm, most often between 20 and 200 nm, in particular and more preferentially between 20 and 150 nm.

The content of reinforcing filler is adjusted by those skilled in the art according to the use of the rubber composition. According to one embodiment of the invention, the content of reinforcing filler in the rubber composition is greater than or equal to 30 phr and less than or equal to 150 phr, preferably greater than or equal to 35 phr and less than or equal to 100 phr. These ranges of reinforcing filler that are defined in this embodiment make it possible to give the rubber composition an improved compromise between its reinforcing and stiffness properties depending on the intended use of the rubber composition in a tyre, in particular for a tread.

The reinforcing filler may be a silica, a carbon black or a mixture of a carbon black and a silica. Preferably, the silica represents more than 50% by weight of the reinforcing filler. More preferentially, the silica represents more than 85% by weight of the reinforcing filler.

The silica used can be any reinforcing silica known to those skilled in the art, in particular any precipitated or fumed silica exhibiting a BET specific surface area and a CTAB specific surface area both of less than 450 m2/g, preferably within a range extending from 30 to 400 $m^2/g$, in particular from 60 to 300 $m^2/g$. In the present disclosure, the BET specific surface area is determined by gas adsorption using the Brunauer-Emmett-Teller method described in "The Journal of the American Chemical Society", (Vol. 60, page 309, February 1938), and more specifically according to a method derived from standard NF ISO 5794-1, appendix E, of June 2010 [multipoint (5 point) volumetric method-gas: nitrogen-degassing under vacuum: one hour at 160° C.—relative pressure p/po range: 0.05 to 0.17].

The CTAB specific surface area values were determined according to the standard NF ISO 5794-1, appendix G of June 2010. The process is based on the adsorption of CTAB (N-hexadecyl-N,N, N-trimethylammonium bromide) on the "external" surface of the reinforcing filler.

Any type of precipitated silica, in particular highly dispersible precipitated silicas (referred to as "HDS" for "highly dispersible" or "highly dispersible silica"), can be used. These precipitated silicas, which may or may not be highly dispersible, are well known to those skilled in the art. Mention may be made, for example, of the silicas described in applications WO03/016215-A1 and WO03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G (-D), Hi-Sil EZ160G (-D), Hi-Sil EZ200G (-D), Hi-Sil 243LD, Hi-Sil 210 and Hi-Sil HDP 320G silicas from PPG.

The silica may be a mixture of various silicas, in which case the proportions of silica in the reinforcing filler relate to all the silicas.

All carbon blacks, in particular the blacks conventionally used in tyres or their treads, are suitable as carbon blacks. Among said carbon blacks, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used.

The carbon black may be a mixture of various carbon blacks, in which case the contents of carbon black relate to all the carbon blacks.

Preferably, the carbon black is used at a content of less than or equal to 20 phr, more preferentially less than or equal to 10 phr (for example the carbon black content may be in a range extending from 0.5 to 20 phr, in particular extending from 1 to 10 phr). Advantageously, the carbon black content in the rubber composition is less than or equal to 5 phr. Within the intervals indicated, the colouring properties (black pigmenting agent) and UV-stabilizing properties of the carbon blacks are beneficial, without, moreover, adversely affecting the typical performance qualities contributed by the silica.

To couple the reinforcing inorganic filler, in this case silica, to the elastomer, it is possible to use, in a well-known manner, an at least bifunctional coupling agent (or bonding agent) intended to ensure a sufficient connection, of chemical and/or physical nature, between the inorganic filler (surface of its particles) and the elastomer, in which case the rubber composition comprises a coupling agent for binding the silica to the elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the elastomer.

Use is in particular made of silane polysulfides, referred to as "symmetrical" or "asymmetrical" depending on their specific structure, as described, for example, in applications WO03/002648-A1 (or US2005/016651-A1) and WO03/002649-A1 (or US2005/016650-A1). Suitable in particular, without the definition below being limiting, are silane polysulfides corresponding to general formula (IV) below in which:

$$Z-A-S_x-A-Z \qquad (IV)$$

x is an integer from 2 to 8 (preferably from 2 to 5);
the A symbols, which may be identical or different, represent a divalent hydrocarbon radical (preferably a $C_1$-$C_{18}$ alkylene group or a $C_6$-$C_{12}$ arylene group, more particularly a $C_1$-$C_{10}$ alkylene, in particular a $C_1$-$C_4$ alkylene, in particular propylene);
the Z symbols, which may be identical or different, correspond to one of the three formulae below:

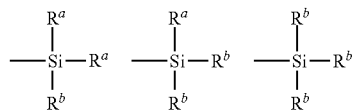

in which:
the $R^a$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl groups, cyclohexyl or phenyl, in particular $C_1$-$C_4$ alkyl groups, more particularly methyl and/or ethyl),
the $R^b$ radicals, which may be substituted or unsubstituted and identical to or different from one another, represent a $C_1$-$C_{18}$ alkoxyl group or a $C_5$-$C_{18}$ cycloalkoxyl group (preferably a group selected from $C_1$-$C_8$ alkoxyls and $C_5$-$C_8$ cycloalkoxyls, more preferentially still a group selected from $C_1$-$C_4$ alkoxyls, in particular methoxyl and ethoxyl), or a hydroxyl group, or such that two $R^b$ radicals represent a $C_3$-$C_{18}$ dialkoxyl group.

In the case of a mixture of alkoxysilane polysulfides corresponding to the above formula (V), in particular normal commercially available mixtures, the mean value of the "x" indices is a fractional number preferably within a range extending from 2 to 5, more preferentially close to 4.

Mention will more particularly be made, as examples of silane polysulfides, of bis(($C_1$-$C_4$)alkoxyl ($C_1$-$C_4$)alkylsilyl ($C_1$-$C_4$)alkyl) polysulfides (in particular disulfides, trisulfides or tetrasulfides), such as, for example, bis(3-trimethoxysilylpropyl) or bis(3-triethoxysilylpropyl) polysulfides. Among these compounds, use is made in particular of bis(3-triethoxysilylpropyl) tetrasulfide, abbreviated to TESPT, of formula $[(C_2H_5O)_3Si(CH_2)_3S_2]_2$ sold under the name Si69 by Evonik or bis(triethoxysilylpropyl) disulfide, abbreviated to TESPD, of formula $[(C_2H_5O)_3Si(CH_2)_3S]_2$ sold under the name Si75 by Evonik. Mention will also be made, as preferred examples, of bis(mono($C_1$-$C_4$)alkoxydi ($C_1$-$C_4$)alkylsilylpropyl) polysulfides (in particular disulfides, trisulfides or tetrasulfides), more particularly of bis (monoethoxydimethylsilylpropyl) tetrasulfide, such as described in the abovementioned patent application WO02/083782-A1 (or U.S. Pat. No. 7,217,751-B2).

Of course, use might also be made of mixtures of the coupling agents described above.

The content of coupling agent in the composition of the invention is advantageously less than or equal to 25 phr, it being understood that it is generally desirable to use as little as possible thereof. Typically, the content of coupling agent represents from 0.5% to 15% by weight, with respect to the amount of reinforcing inorganic filler. Its content is preferably within a range extending from 0.5 to 20 phr, more preferentially within a range extending from 3 to 15 phr. This content is easily adjusted by a person skilled in the art according to the content of reinforcing inorganic filler used in the composition of the invention.

The crosslinking system which is useful for the purposes of the invention is preferentially a vulcanization system, that is to say based on sulfur and on a primary vulcanization accelerator. The sulfur is typically provided in the form of molecular sulfur or of a sulfur-donating agent, preferably in molecular form. Sulfur in molecular form is also referred to by the term molecular sulfur. The term "sulfur donor" means any compound which releases sulfur atoms, optionally combined in the form of a polysulfide chain, which are capable of inserting into the polysulfide chains formed during the vulcanization and bridging the elastomer chains. Various known secondary vulcanization accelerators or vulcanization activators, such as zinc oxide, stearic acid, guanidine derivatives (in particular diphenylguanidine), and the like, are added to the vulcanization system, being incorporated during the first non-productive phase and/or during the productive phase. The sulfur content is preferably between 0.5 and 3.0 phr and the content of the primary accelerator is preferably between 0.5 and 5.0 phr. These preferential contents may apply to any one of the embodiments of the invention.

Use may be made, as (primary or secondary) vulcanization accelerator, of any compound that is capable of acting as accelerator of the vulcanization of the diene elastomers in the presence of sulfur, notably accelerators of the thiazole type and also derivatives thereof, accelerators of sulfenamide type as regards the primary accelerators, or accelerators of thiuram, dithiocarbamate, dithiophosphate, thiourea and xanthate type as regards the secondary accelerators.

The crosslinking (or curing), where appropriate the vulcanization, is carried out in a known manner at a temperature generally of between 130° C. and 200° C., for a sufficient time which may vary, for example, between 5 and 90 min, depending especially on the curing temperature, on the crosslinking system adopted and on the crosslinking kinetics of the composition in question.

The rubber composition in accordance with the invention may also comprise all or some of the usual additives customarily used in the elastomer compositions intended for the manufacture of tyres, in particular pigments, protective agents such as antiozone waxes, chemical antiozonants, antioxidants and plasticizers.

According to one particular embodiment of the invention, the rubber composition also comprises a plasticizer. The content of plasticizer in the rubber composition may vary to a great extent, in particular depending on the content of reinforcing filler in the rubber composition and depending on the nature of the plasticizer used. Preferably, it is greater than 10 phr and less than or equal to 100 phr, preferably greater than or equal to 30 phr and less than or equal to 90 phr.

According to a particularly preferred embodiment of the invention, the rubber composition comprises, as plasticizer, a hydrocarbon resin. This embodiment is particularly preferred for use of the rubber composition in a tread. Hydrocarbon resins, also known as hydrocarbon plasticizing resins, are polymers well known to a person skilled in the art, essentially based on carbon and hydrogen but which can comprise other types of atoms, for example oxygen, which can be used in particular as plasticizing agents or tackifying agents in polymer matrices. They are by nature at least partially miscible (i.e. compatible) at the contents used with the polymer compositions for which they are intended, so as to act as true diluents. They have been described, for example, in the book entitled "Hydrocarbon Resins" by R. Mildenberg, M. Zander and G. Collin (New York, V C H, 1997, ISBN 3-527-28617-9), Chapter 5 of which is devoted to their applications, notably in the tyre rubber field (5.5. "Rubber Tires and Mechanical Goods"). In a known way, these hydrocarbon resins can also be described as thermoplastic resins in the sense that they soften when heated and can thus be moulded. The softening point of the hydrocarbon resins is measured according to standard ISO 4625 ("Ring and Ball" method). The Tg is measured according to standard ASTM D3418 (1999). The macrostructure (Mw, Mn and PI) of the hydrocarbon resin is determined by size exclusion chromatography (SEC); solvent tetrahydrofuran; temperature 35° C.; concentration 1 g/l; flow rate 1 ml/min; solution filtered through a filter with a porosity of 0.45 μm before injection; Moore calibration with polystyrene standards; set of 3 Waters columns in series (Styragel HR4E, HR1 and HR0.5); detection by differential refractometer (Waters 2410) and its associated operating software (Waters Empower).

The hydrocarbon resins may be aliphatic or aromatic or else of the aliphatic/aromatic type, that is to say based on aliphatic and/or aromatic monomers. They can be natural or synthetic and may or may not be petroleum-based (if such is the case, they are also known under the name of petroleum resins). Preferably, the hydrocarbon plasticizing resin has a glass transition temperature above 20° C.

Advantageously, the hydrocarbon plasticizing resin has at least any one of the following features, more preferentially all of them:
- a Tg above 30° C.;
- a number-average molecular weight (Mn) of between 300 and 2000 g/mol, more preferentially between 400 and 1500 g/mol;
- a polydispersity index (PI) of less than 3, more preferentially of less than 2 (as a reminder: PI=Mw/Mn with Mw the weight-average molecular weight).

Preferably, the hydrocarbon plasticizing resin is selected from the group consisting of cyclopentadiene homopolymer resins, cyclopentadiene copolymer resins, dicyclopentadiene homopolymer resins, dicyclopentadiene copolymer resins, terpene homopolymer resins, terpene copolymer resins, C5-cut homopolymer resins, C5-cut copolymer resins, C9-cut homopolymer resins, C9-cut copolymer resins, hydrogenated cyclopentadiene homopolymer resins and hydrogenated cyclopentadiene copolymer resins.

More preferably, the hydrocarbon plasticizing resin is a C9-cut copolymer resin or a dicyclopentadiene copolymer resin, which is hydrogenated or non-hydrogenated. By way of example, mention may very particularly be made of C9-cut copolymer resins and hydrogenated dicyclopentadiene copolymer resins.

As a plasticizer which is useful for the purposes of the invention, mention may also be made of the hydrocarbon liquid plasticizing agents known to soften a rubber composition by diluting the elastomer and the reinforcing filler of the rubber composition. Their Tg is typically less than −20° C., preferentially less than −40° C. Any hydrocarbon extender oil or any hydrocarbon liquid plasticizing agent known for its plasticizing properties with respect to diene elastomers can be used. At ambient temperature (23° C.), these plasticizers or these oils, which are more or less viscous, are liquids (that is to say, as a reminder, substances which have the ability to eventually take on the shape of their container), as opposed especially to hydrocarbon plasticizing resins which are by nature solid at ambient temperature.

As hydrocarbon liquid plasticizing agents, mention may be made of liquid diene polymers, polyolefin oils, naphthenic oils, paraffinic oils, DAE oils, MES (Medium Extracted Solvate) oils, TDAE (Treated Distillate Aromatic Extract) oils, RAE (Residual Aromatic Extract) oils, TRAE (Treated Residual Aromatic Extract) oils and SRAE (Safety Residual Aromatic Extract) oils, mineral oils, and mixtures of these compounds.

Preferably, the hydrocarbon liquid plasticizing agent is selected from the group consisting of liquid diene polymers, aliphatic polyolefin oils, paraffinic oils, MES oils, TDAE oils, TRAE oils, SRAE oils, mineral oils and mixtures thereof. More preferentially, the hydrocarbon liquid plasticizing agent is a liquid diene polymer, an aliphatic polyolefin oil, a paraffinic oil, an MES oil or mixtures thereof.

The rubber composition, before crosslinking, may be manufactured in appropriate mixers, using two successive phases of preparation according to a general procedure well known to a person skilled in the art: a first phase of thermomechanical working or kneading (sometimes referred to as a "non-productive" phase) at high temperature, up to a maximum temperature of between 110° C. and 190° C., preferably between 130° C. and 180° C., followed by a second phase of mechanical working (sometimes referred to as a "productive" phase) at lower temperature, typically below 110° C., for example between 40° C. and 100° C., during which finishing phase the sulfur or the sulfur donor and the vulcanization accelerator are incorporated.

By way of example, the first (non-productive) phase is carried out in a single thermomechanical step during which all the necessary constituents, the optional additional processing aids and various other additives, with the exception of the crosslinking system, are introduced into an appropriate mixer, such as a standard internal mixer. The total duration of the kneading, in this non-productive phase, is preferably between 1 and 15 min. After cooling of the mixture thus obtained during the first non-productive phase, the crosslinking system is then incorporated at low temperature, generally in an external mixer, such as an open mill; everything is then mixed (productive phase) for a few minutes, for example between 2 and 15 min.

The rubber composition can be calendered or extruded in the form of a sheet or of a slab, in particular for a laboratory characterization, or else in the form of a rubber semi-finished product (or profiled element) which can be used in a tyre. The composition may be either in the uncured state (before crosslinking or vulcanization) or in the cured state (after crosslinking or vulcanization), may be a semi-finished product which can be used in a tyre.

The tyre comprising a tread, another subject of the invention, comprises a rubber composition in accordance with the invention, preferably in the tread.

In summary, the invention is advantageously implemented according to any one of the following embodiments 1 to 24:

Embodiment 1: Rubber composition which comprises a reinforcing filler, a crosslinking system and more than 50 phr to 100 phr of an elastomer which is a copolymer of ethylene and of a 1,3-diene of formula (I), $$CH_2=CR-CH=CH_2 \qquad (I)$$

the symbol R representing a hydrocarbon chain having from 3 to 20 carbon atoms.

Embodiment 2: Rubber composition according to embodiment 1, in which the copolymer contains ethylene units which represent between 50 mol % and 95 mol % of the ethylene units and of the units of the 1,3-diene.

Embodiment 3: Rubber composition according to either one of embodiments 1 and 2, in which the copolymer contains ethylene units which represent at least 60 mol %, preferably at least 70 mol % of the ethylene units and of the units of the 1,3-diene.

Embodiment 4: Rubber composition according to any one of embodiments 1 to 3, in which the copolymer contains ethylene units which represent at most 90 mol % of the ethylene units and of the units of the 1,3-diene.

Embodiment 5: Rubber composition according to any one of embodiments 1 to 4, in which the copolymer contains ethylene units which represent at most 85 mol % of the ethylene units and of the units of the 1,3-diene.

Embodiment 6: Rubber composition according to any one of embodiments 1 to 5, in which the symbol R represents a hydrocarbon chain having from 6 to 16 carbon atoms.

Embodiment 7: Rubber composition according to any one of embodiments 1 to 6, in which the symbol R represents an acyclic chain.

Embodiment 8: Rubber composition according to any one of embodiments 1 to 7, in which the symbol R represents a linear or branched chain.

Embodiment 9: Rubber composition according to any one of embodiments 1 to 8, in which the symbol R represents an aliphatic chain.

Embodiment 10: Rubber composition according to any one of embodiments 1 to 9, in which the copolymer has a glass transition temperature below −35° C., preferably between −90° C. and −35° C.

Embodiment 11: Rubber composition according to any one of embodiments 1 to 10, in which the copolymer contains units of the 1,3-diene of 1,2 or 3,4 configuration which represent more than 50 mol % of the units of the 1,3-diene.

Embodiment 12: Rubber composition according to any one of embodiments 1 to 11, in which the 1,3-diene is myrcene or β-farnesene.

Embodiment 13: Rubber composition according to any one of embodiments 1 to 12, in which the copolymer is a statistical copolymer.

Embodiment 14: Rubber composition according to any one of embodiments 1 to 13, which composition comprises 100 phr of a copolymer of ethylene and of a 1,3-diene of formula (I).

Embodiment 15: Rubber composition according to any one of embodiments 1 to 14, in which the reinforcing filler is a silica, a carbon black or a mixture of a carbon black and a silica.

Embodiment 16: Rubber composition according to any one of embodiments 1 to 15, in which the content of reinforcing filler is greater than or equal to 30 phr and less than or equal to 150 phr.

Embodiment 17: Rubber composition according to any one of embodiments 1 to 16, in which the content of reinforcing filler is greater than or equal to 35 phr and less than or equal to 100 phr.

Embodiment 18: Rubber composition according to any one of embodiments 1 to 17, in which the reinforcing filler comprises a silica which represents more than 50% by weight of the reinforcing filler.

Embodiment 19: Rubber composition according to any one of embodiments 1 to 18, which composition comprises a plasticizer.

Embodiment 20: Rubber composition according to any one of embodiments 1 to 19, in which the plasticizer content is greater than 10 phr and less than or equal to 100 phr.

Embodiment 21: Rubber composition according to any one of embodiments 1 to 20, in which the plasticizer content is greater than or equal to 30 phr and less than or equal to 90 phr.

Embodiment 22: Rubber composition according to any one of embodiments 1 to 21, which composition comprises, as plasticizer, a hydrocarbon resin.

Embodiment 23: Tyre comprising a tread, which tyre comprises a rubber composition defined in any one of embodiments 1 to 22.

Embodiment 24: Tyre according to embodiment 23, in which the rubber composition is in the tread.

The abovementioned characteristics of the present invention, and also others, will be better understood on reading the following description of several exemplary embodiments of the invention, given by way of illustration and without limitation.

EXAMPLE

II.1 Tests and Measurements:
II.1-1 Determination of the Microstructure of the Elastomers:

The spectral characterization and the measurements of the microstructure of the copolymers of ethylene and of 1,3-myrcene are carried out by nuclear magnetic resonance (NMR) spectroscopy.

Spectrometer: For these measurements, a Bruker Avance III HD 400 MHz spectrometer is used, equipped with a Bruker cryo-BBFO z-grad 5 mm probe.

Experiments: The $^1$H experiments are recorded using a radiofrequency pulse with a tilt angle of 30°, the number of repetitions is 128 with a recycle delay of 5 seconds. The HSQC (Heteronuclear Single Quantum Coherence) and HMBC (Heteronuclear Multiple-Bond Correlation) $^1$H-$^{13}$C NMR correlation experiments are recorded with a number of repetitions of 128 and a number of increments of 128. The experiments are carried out at 25° C.

Preparation of the sample: 25 mg of sample are dissolved in 1 ml of deuterated chloroform ($CDCl_3$).

Sample calibration: The axes of the $^1$H and $^{13}$C chemical shifts are calibrated with respect to the protonated impurity of the solvent ($CHCl_3$) at $\delta_{1H}$=7.2 ppm and $\delta_{13C}$=77 ppm.

Spectral assignment for the copolymers of ethylene and of 1,3-myrcene (see Chem 1):

In the representation Chem 1, the symbols $R^1$ and $R_2$ represent the points of attachment of the unit to the polymer chain. In the representation Chem 1, the signals of the insertion forms of the 1,3-diene A, B and C were observed on the different spectra recorded. According to S. Georges et al. (S. Georges, M. Bria, P. Zinck and M. Visseaux, Polymer, 55 (2014), 3869-3878), the signal of the —CH=group No. 8" characteristic of the form C exhibits $^1$H and $^{13}$C chemical shifts identical to the —CH=group No. 3.

The chemical shifts of the signals characteristic of the moieties A, B and C are presented in Table 1. The moieties A, B and C correspond respectively to the units of 3,4 configuration, of 1,2 configuration and of trans-1,4 configuration.

The quantifications were carried out from the integration of the 1D 1H NMR spectra using the Topspin software.

The integrated signals for the quantification of the various moieties are:

Ethylene: signal at 1.2 ppm corresponding to 4 protons.

Total myrcene: signal No. 1 (1.59 ppm) corresponding to 6 protons.
Form A: signal No. 7 (4.67 ppm) corresponding to 2 protons.
Form B: signal No. 8' (5.54 ppm) corresponding to 1 proton.

The quantification of the microstructure is carried out in molar percentage (molar %) as follows: Molar % of a moiety=$^1$H integral of a moiety*100/Σ($^1$H integrals of each moiety).

Table 1

TABLE 1

Assignment of the 1H and 13C signals of Ethylene/Myrcene copolymers

| $\delta_{1H}$ (ppm) | $\delta_{13C}$ (ppm) | Group |
|---|---|---|
| 5.54 | 146.4 | 8' |
| 5.07 | 124.6 | 3 + 8" |
| 4.97-4.79 | 112.0 | 9' |
| 4.67 | 108.5 | 7 |
| 2.06 | 26.5 | 4 |
| 2.0-1.79 | 31.8 | 5 + 5' + 5" |
|  | 44.5 | 8 |
| 1.59 | 25.9 and 17.0 | 1 |
| 1.2 | 36.8-24.0 | CH$_2$ ethylene |

The quantifications were carried out from the integration of the 1D 1H NMR spectra using the Topspin software.

The integrated signals for the quantification of the various moieties are:

Ethylene: signal at 1.2 ppm corresponding to 4 protons.
Total myrcene: signal No. 1 (1.59 ppm) corresponding to 6 protons.
Form A: signal No. 7 (4.67 ppm) corresponding to 2 protons.
Form B: signal No. 8' (5.54 ppm) corresponding to 1 proton.

The quantification of the microstructure is carried out in molar percentage (molar %) as follows: Molar % of a moiety=$^1$H integral of a moiety×100/Σ($^1$H integrals of each moiety).

[Chem 1]

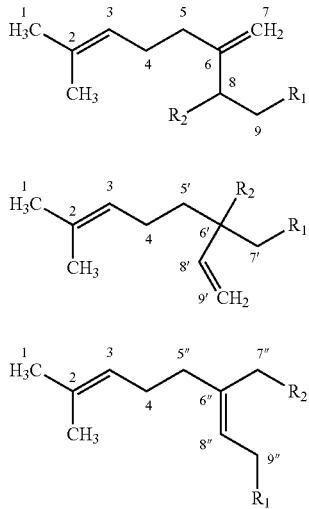

II.1-2 Determination of the Glass Transition Temperature of the Polymers:

The glass transition temperature is measured by means of a differential calorimeter (differential scanning calorimeter) according to standard ASTM D3418 (1999).

II.1-3 Stiffness and Hysteresis of the Rubber Compositions:

The dynamic properties are measured on a viscosity analyser (Metravib VA4000) according to standard D 5992-96. The response of a sample of vulcanized composition (cylindrical test specimen with a thickness of 4 mm and a cross section of 400 mm$^2$), subjected to a simple alternating sinusoidal shear stress at an imposed stress of 0.7 MPa and at a frequency of 10 Hz, during a temperature sweep, from a minimum temperature below the Tg of the elastomers of the compositions up to a maximum temperature above 100° C., is recorded. The results made use of are the complex dynamic shear modulus (G*) and the loss factor tan δ; the values of G* are taken at the temperature of 60° C. and the loss factor tan δ at 20° C. and 40° C.

The stiffness and hysteresis results are expressed in base 100 relative to a control taken as reference. A value of less than 100 indicates a value lower than that of the control.

11.2. Synthesis of the Polymers:

In the synthesis of copolymers in accordance with the invention, the 1,3-diene used is myrcene, a 1,3-diene of formula (I) in which R is a hydrocarbon group having 6 carbon atoms of formula (I).

In myrcene, R corresponds to the formula CH$_2$—CH$_2$—CH=CMe$_2$.

All the reagents are obtained commercially, except the metallocenes [{Me$_2$SiFlu$_2$Nd(μ-BH$_4$)$_2$Li(THF)}] is prepared according to the procedure described in patent application WO 2007054224.

The butyloctylmagnesium BOMAG (20% in heptane, C=0.88 mol.l$^{-1}$) originates from Chemtura and is stored in a Schlenk tube under an inert atmosphere. The ethylene, of N35 grade, originates from Air Liquide and is used without prepurification. The myrcene (purity ≥95%) is obtained from Sigma-Aldrich.

The Mooney viscosity is measured using an oscillating consistometer as described in standard ASTM D1646 (1999). The measurement is carried out according to the following principle: the sample, analysed in the uncured state (i.e. before curing), is moulded (shaped) in a cylindrical chamber heated to a given temperature (100° C.). After preheating for 1 minute, the rotor rotates within the test specimen at 2 revolutions/minute and the working torque for maintaining this movement is measured after rotating for 4 minutes. The Mooney viscosity (ML) is expressed in "Mooney unit" (MU, with 1 MU=0.83 newton.metre).

2.1-Copolymer of Ethylene and 1,3-Butadiene: Elastomer E1

To a reactor containing, at 80° C., methylcyclohexane, ethylene (Et) and butadiene (Bd) in the proportions indicated in Table 2, butyloctylmagnesium (BOMAG) is added to neutralize the impurities in the reactor, then the catalytic system is added (cf. Table 2). At this time, the reaction temperature is regulated at 80° C. and the polymerization reaction starts. The polymerization reaction takes place at a constant pressure of 8 bar. The reactor is fed throughout the polymerization with ethylene and butadiene in the proportions defined in Table 2. The polymerization reaction is stopped by cooling, degassing of the reactor and addition of ethanol. An antioxidant is added to the polymer solution.

The copolymer is recovered by drying in an oven under vacuum to constant weight. The Mooney viscosity of E1 is 85.

The catalytic system is a preformed catalytic system. It is prepared in methylcyclohexane from a metallocene, [Me$_2$Si(Flu)$_2$Nd(μ-BH$_4$)$_2$Li(THF)], a co-catalyst, butyloctylmagnesium (BOMAG), and a preformation monomer, 1,3-butadiene, in the contents indicated in Table 2. It is prepared according to a preparation method in accordance with paragraph II.1 of patent application WO 2017093654 A1.

2.2-Copolymer of Ethylene and Myrcene: Elastomer E2

The polymer is synthesized according to the following procedure:

To a reactor containing, at 80° C., methylcyclohexane, ethylene and myrcene (My) in the proportions indicated in Table 2, butyloctylmagnesium (BOMAG) is added to neutralize the impurities in the reactor, then the catalytic system is added (cf. Table 2). At this time, the reaction temperature is regulated at 80° C. and the polymerization reaction starts. The polymerization reaction takes place at a constant pressure of 8 bar. The reactor is fed throughout the polymerization with ethylene and myrcene in the proportions defined in Table 2. The polymerization reaction is stopped by cooling, degassing of the reactor and addition of ethanol. An antioxidant is added to the polymer solution. The copolymer is recovered by drying in an oven under vacuum to constant weight. The Mooney viscosity of E2 is 17.

The catalytic system is a preformed catalytic system. It is prepared in methylcyclohexane from a metallocene, [Me$_2$Si(Flu)$_2$Nd(μ-BH$_4$)$_2$Li(THF)], a co-catalyst, butyloctylmagnesium (BOMAG), and a preformation monomer, 1,3-butadiene, in the contents indicated in Table 2. It is prepared according to a preparation method in accordance with paragraph II.1 of patent application WO 2017093654 A1.

The microstructure of the polymers and the properties thereof are shown in Tables 3 and 4.

2.3 Preparation of the Rubber Compositions:

Rubber compositions, of which the formulation expressed in phr (parts by weight per hundred parts of elastomer) appears in Table 5, were prepared according to the following procedure: the copolymer, the reinforcing filler, and also the various other ingredients, with the exception of the vulcanization system, are successively introduced into an internal mixer (final degree of filling: approximately 70% by volume), the initial vessel temperature of which is approximately 80° C. Thermomechanical working (non-productive phase) is then carried out in one step, which lasts in total approximately 5 min, until a maximum "dropping" temperature of 150° C. is reached. The mixture thus obtained is recovered and cooled and then sulfur and the accelerator are incorporated on a mixer (homofinisher) at 40° C., everything being mixed (productive phase) for approximately ten minutes. The compositions thus obtained are subsequently calendered, either in the form of slabs (thickness of 2 to 3 mm) or of thin sheets of rubber for the measurement of their physical or mechanical properties.

Composition C1 which contains the elastomer E1, a copolymer of ethylene and 1,3-butadiene, is a composition not in accordance with the invention. Composition C2 which contains the elastomer E2, a copolymer of ethylene and myrcene, is a composition in accordance with the invention.

2.4 Results:

The results are given in Table 6.

Composition C2 has a lower stiffness than composition C1 without the hysteresis properties being affected. This result is obtained for a comparable diene unit content (14% for the elastomer E1, 13% for the elastomer E2) and an ethylene unit content that is much higher for E2 than for E1 (87% versus 78%). Despite a much higher ethylene content, the rubber composition C2 in accordance with the invention exhibits an improved compromise between the stiffness and hysteresis properties.

TABLE 2

| Synthesis | Metallocene concentration (mmol/l) | Alkylating agent concentration (mmol/l) | Preformation monomer/Nd metal molar ratio | Composition of the feed (mol % Eth/Bdt) | Composition of the feed (mol % Eth/Myr) |
|---|---|---|---|---|---|
| E1 | 0.07 | 0.36 | 90 | 80/20 | — |
| E2 | 0.05 | 0.33 | 90 | — | 85/15 |

TABLE 3

| Elastomer | Ethylene (mol %) | Butadiene (mol %) | 1,2-Cyclohexanediyl (mol %) | Myrcene (mol %) | 1,4 Myrcene (mol %/mol % myrcene) | 1,2 Myrcene (mol %/mol % myrcene) | 3,4 Myrcene (mol %/mol % myrcene) |
|---|---|---|---|---|---|---|---|
| E1 | 78 | 14 | 8 | — | — | — | — |
| E2 | 87 | — | — | 13 | 31 | 7 | 62 |

TABLE 4

| Elastomer | Tg (° C.) | Crystallinity (%) |
|---|---|---|
| E1 | −40 | 5 |
| E2 | −58 | 17 |

TABLE 5

| Composition | C1 | C2 |
|---|---|---|
| Elastomer E1 | 100 | 0 |
| Elastomer E2 | 0 | 100 |
| Carbon black (1) | 3 | 3 |
| Silica (2) | 76 | 76 |
| Liquid plasticizing agent (3) | 22 | 22 |
| Plasticizing resin (4) | 51 | 51 |
| Antioxidant (5) | 2 | 2 |
| Anti-ozonant wax | 2 | 2 |
| Coupling agent (6) | 6 | 6 |
| Stearic acid (7) | 2 | 2 |

TABLE 5-continued

| Composition | C1 | C2 |
|---|---|---|
| DPG (8) | 1.5 | 1.5 |
| ZnO (9) | 1 | 1 |
| Accelerator (10) | 2 | 2 |
| Sulfur | 1 | 1 |

(1) N234
(2) Zeosil 1165 MP, from Solvay-Rhodia, in the form of micropearls
(3) MES/HPD (Catenex SNR from Shell)
(4) Escorez 5600 C9/Dicyclopentadiene hydrocarbon resin from Exxon (Tg = 55° C.)
(5) N-(1,3-Dimethylbutyl)-N-phenyl-para-phenyldiamine (Santoflex 6-PPD from Flexsys)
(6) TESPT (Si69 from Evonik)
(7) Pristerene 4931 stearin from Uniqema
(8) Diphenylguanidine
(9) Zinc oxide, industrial grade from Umicore
(10) N-Cyclohexyl-2-benzothiazolesulfenamide (Santocure CBS from Flexsys)

TABLE 6

| Composition | C1 | C2 |
|---|---|---|
| G* 60° C. | 100 | 51 |
| tanδ 20° C. | 100 | 95 |
| tanδ 40° C. | 100 | 100 |

The invention claimed is:

1. A rubber composition which comprises a reinforcing filler, a crosslinking system and more than 50 to 100 phr of an elastomer which is a copolymer of ethylene and of a 1,3-diene of formula (I),

$$CH_2=CR-CH=CH_2 \qquad (I)$$

the symbol R representing a hydrocarbon chain having from 3 to 20 carbon atoms.

2. The rubber composition according to claim 1, in which the copolymer contains ethylene units which represent between 50 mol % and 95 mol % of the ethylene units and of the units of the 1,3-diene.

3. The rubber composition according to claim 1, in which the copolymer contains ethylene units which represent at least 60 mol %.

4. The rubber composition according to claim 1, in which the copolymer contains ethylene units which represent at most 90 mol % of the ethylene units and of the units of the 1,3-diene.

5. The rubber composition according to claim 1, in which the copolymer contains ethylene units which represent at most 85 mol % of the ethylene units and of the units of the 1,3-diene.

6. The rubber composition according to claim 1, in which the symbol R represents an aliphatic chain.

7. The rubber composition according to claim 1, in which the symbol R represents a hydrocarbon chain having from 6 to 16 carbon atoms.

8. The rubber composition according to claim 1, in which the symbol R represents an acyclic chain.

9. The rubber composition according to claim 1, in which the symbol R represents a linear or branched chain.

10. The rubber composition according to claim 1, in which the copolymer has a glass transition temperature below −35° C.

11. The rubber composition according to claim 1, in which the copolymer contains units of the 1,3-diene of 1,2 or 3,4 configuration which represent more than 50 mol % of the units of the 1,3-diene.

12. The rubber composition according to claim 1, in which the 1,3-diene is myrcene or β-farnesene.

13. The rubber composition according to claim 1, in which the reinforcing filler is a silica, a carbon black or a mixture of a carbon black and a silica.

14. The rubber composition according to claim 1, which composition comprises a plasticizer.

15. A tire comprising a tread, which tire comprises a rubber composition defined in claim 1.

16. The rubber composition according to claim 3, in which the ethylene units represent at least 70 mol % of the ethylene units and of the units of the 1,3-diene.

17. The rubber composition according to claim 10, in which the glass transition temperature is between −90° C. and −35° C.

18. The rubber composition according to claim 14, which the plasticizer is a hydrocarbon plasticizing resin.

* * * * *